(12) United States Patent
Revercomb

(10) Patent No.: US 11,696,632 B2
(45) Date of Patent: Jul. 11, 2023

(54) HOLDER SYSTEMS FOR MOBILE DEVICES

(71) Applicant: Laura Lee Revercomb, Kingston, NY (US)

(72) Inventor: Laura Lee Revercomb, Kingston, NY (US)

(*) Notice: Subject to any disclaimer, the term of this patent is extended or adjusted under 35 U.S.C. 154(b) by 63 days.

(21) Appl. No.: 17/146,920

(22) Filed: Jan. 12, 2021

(65) Prior Publication Data

US 2022/0192351 A1  Jun. 23, 2022

Related U.S. Application Data

(60) Provisional application No. 63/129,417, filed on Dec. 22, 2020.

(51) Int. Cl.
*A45F 3/14* (2006.01)
*A45F 5/00* (2006.01)
*F16M 13/02* (2006.01)
*H04B 1/3888* (2015.01)

(52) U.S. Cl.
CPC ............... *A45F 5/00* (2013.01); *F16M 13/02* (2013.01); *H04B 1/3888* (2013.01); *A45F 2005/006* (2013.01); *A45F 2200/0516* (2013.01)

(58) Field of Classification Search
CPC ........ A45F 2005/006; A45F 2200/0516; A45F 2200/0525; A45F 2005/023; A45F 2005/1013; A45F 3/14; A45F 5/12; A45F 2005/125; Y10T 24/1404; Y10T 24/1406; B65G 7/12; A45C 2011/002; A45C 13/30; A45C 7/0086; A45C 2013/306; A45C 7/0045; A45C 7/0077; A45C 13/1046; A45C 13/38; B65D 63/10
See application file for complete search history.

(56) References Cited

U.S. PATENT DOCUMENTS

| | | | | |
|---|---|---|---|---|
| 3,600,734 | A * | 8/1971 | Pollinger | A43B 5/0425 294/162 |
| 6,182,875 | B1 * | 2/2001 | Fareghi | A45F 3/14 224/264 |
| 6,193,293 | B1 * | 2/2001 | Ybanez | B65G 7/12 294/157 |
| 6,427,886 | B1 * | 8/2002 | Essex | A45F 3/14 294/157 |
| 7,000,809 | B1 * | 2/2006 | Stroud | F21L 4/005 224/250 |
| 2004/0129745 | A1 * | 7/2004 | Condiff | A45F 3/14 224/269 |

(Continued)

*Primary Examiner* — Adam J Waggenspack
(74) *Attorney, Agent, or Firm* — ArentFox Schiff LLP

(57) ABSTRACT

A system for holding a device. The system may include a first securing member and a second securing member respectively located at a first end and a second end of the device holding apparatus. The system may also include where each of the first securing member and the second securing member further includes a first securing member portion and a second securing member portion that define a loop configured to receive a respective corner of a device. The system may also include a bottom support strap connecting the first securing member and the second securing member. The system may also include a first upper support strap connected to the first securing member. Further, the system may include a second upper support strap connected to the second securing member.

11 Claims, 2 Drawing Sheets

(56) References Cited

U.S. PATENT DOCUMENTS

| | | | |
|---|---|---|---|
| 2007/0131726 A1* | 6/2007 | Aliev | A45F 3/14 224/257 |
| 2010/0288900 A1* | 11/2010 | Janik | B60R 11/0241 248/315 |
| 2015/0249730 A1* | 9/2015 | Larsen | H04M 1/05 248/342 |
| 2018/0310696 A1* | 11/2018 | Getter | A44B 11/06 |

* cited by examiner

HOLDER SYSTEMS FOR MOBILE DEVICES

CROSS-REFERENCE TO RELATED APPLICATIONS

This application claims priority to U.S. Provisional Application No. 63/129,417 filed Dec. 22, 2020, the disclosure of which is expressly incorporated herein by the reference in its entirety.

TECHNICAL FIELD

The present disclosure generally relates to an apparatus for suspending a device in the air such that the user does not need to hold or prop up the device while using it.

BACKGROUND

Holding or propping up a device such as a phone or other personal electronic device has been the preferred method of using such devices hands-free. These methods for using a device can limit the places a device can be used or impede the ability to see a portion of the device, such as a display screen of a personal electronic device. The issues with the present forms of using a device in a hands-free mode of operation calls for a more advantageous and efficient method of using a device hands-free.

SUMMARY

A device holding apparatus comprising a first securing member and second securing member respectively located at a first and second end of a device holding apparatus. Each securing member further comprises a first securing member portion and a second securing member portion that define a loop configured to receive a respective corner of a device. The device holding apparatus further comprises a bottom support strap connecting the first securing member and the second securing member. A first upper support strap is connected to the first securing member and a second upper support strap connected to the second securing member.

DETAILED DESCRIPTION

Figure 1:
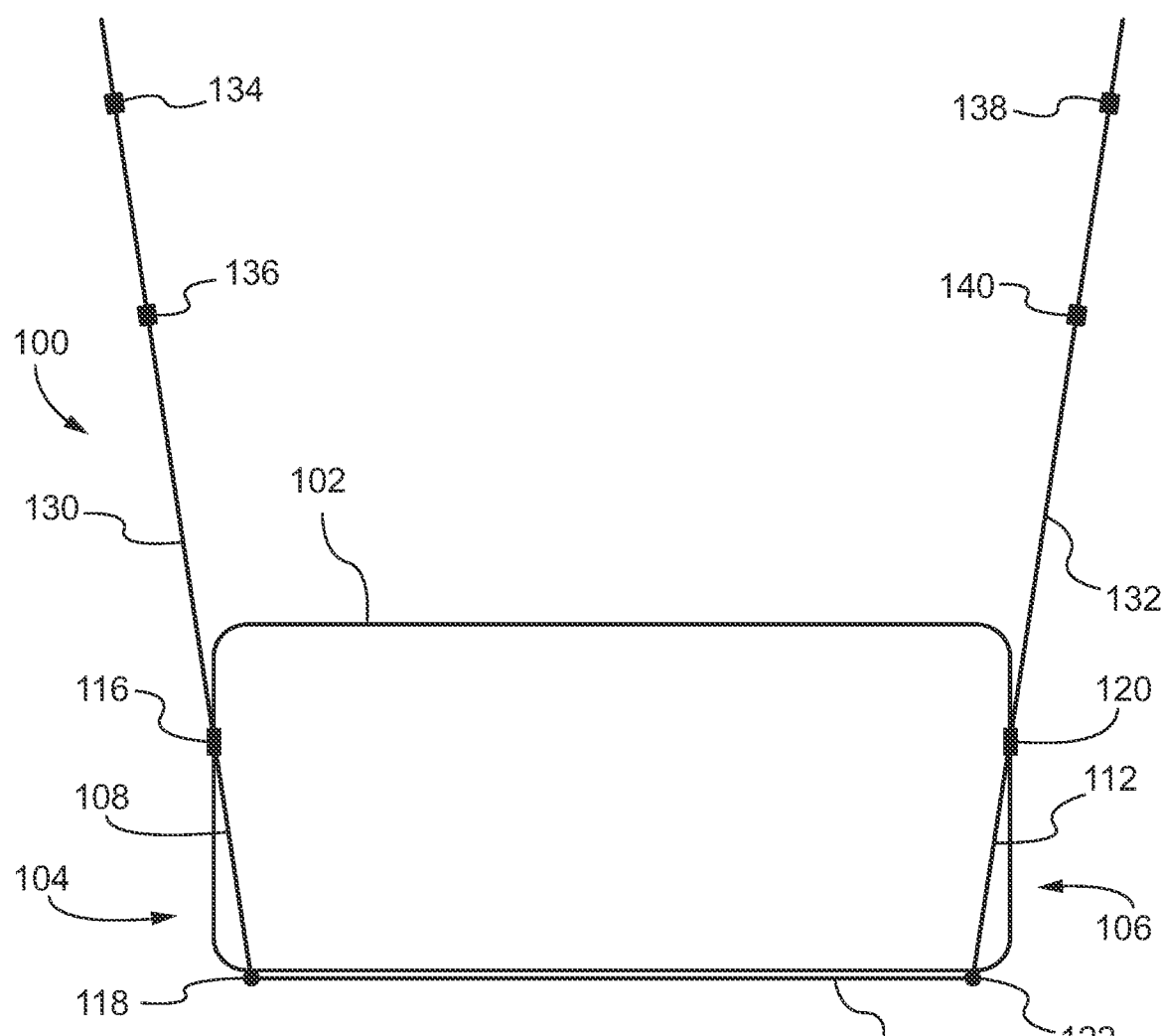
FIG. 1 is a front view of an example device holding apparatus, including a device being secured with the device holding apparatus in a vertical orientation.

Various aspects of the disclosure are now described with reference to the drawings, wherein like reference numerals are used to refer to elements throughout. In the following description, for purposes of explanation, numerous specific details are set forth in order to promote a thorough understanding of one or more aspects of the disclosure. It may be evident in some or all instances, however, that any aspects described below can be practiced without adopting the specific design details described below.

A device holding apparatus is provided according to an exemplary aspect of the present disclosure. The present disclosure refers to, as an example, a small electronic device such as a mobile phone, but can be implemented on other types of devices, this includes, but is not limited to: mobile computers, tablet computers, netbooks, digital media players, enterprise digital assistants, graphing calculators, handheld game consoles, laptops, camera phones, digital cameras, digital camcorders, digital still cameras, and digital video cameras.

In exemplary aspects, the device holding apparatus comprises a plurality of securing members, such as support straps, which allow the device to be securely suspended within the device holding apparatus. Further, the device holding apparatus is highly adjustable so as to allow the user to suspend the device from a variety of fixtures, or a body portion (e.g., neck) of the user, allowing the device to be used anywhere the user may be located.

Figure 2:
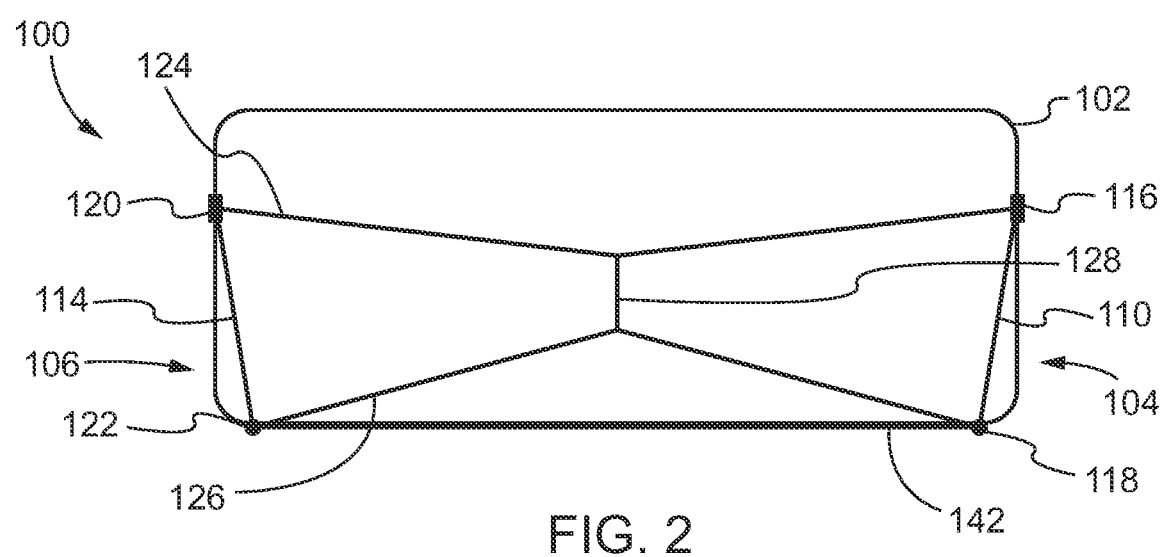
FIG. 2 is a back view of the device hammock of FIG. 1.
Figure 3:
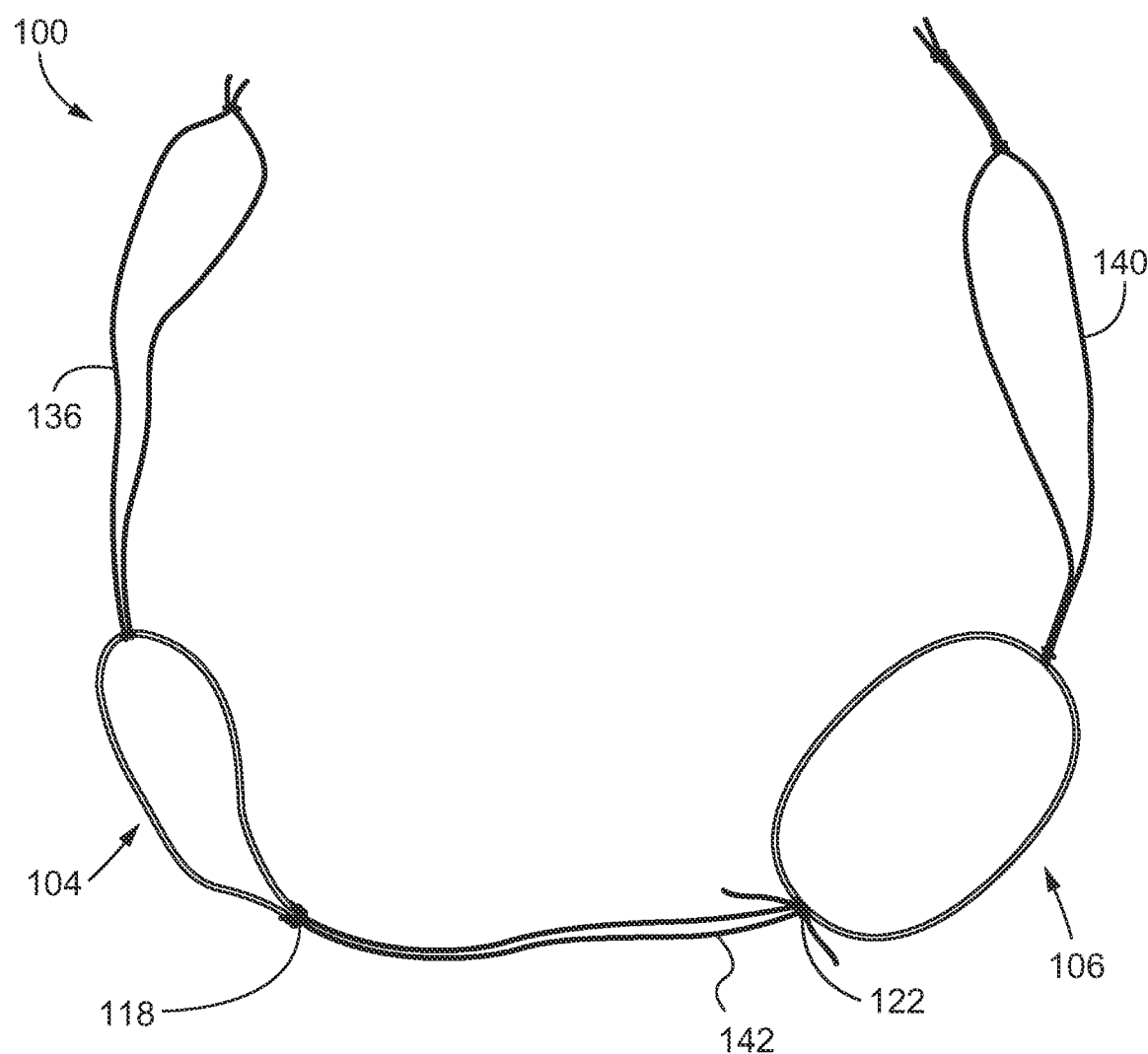
FIG. 3 is a front plan view of an example of the device holding apparatus.

Referring to FIGS. 1-3, in an example implementation, the device holding apparatus 100 securely suspends the device 102 from any fixture seen fit by the user, or from a body part, e.g., a neck, of the user. The device holding apparatus 100 includes first and second securing members 104, 106, which hold the device 102 at opposite ends so as to secure the device 102 within the device holding apparatus 100.

The first securing member 104 is located on one side of the device holding apparatus 100 for securing one end of the device 102, and the second securing member 106 is located on the opposite side of the device holding apparatus 100 for securing the opposite side of the device 102. The first securing member 104 further includes a first securing member portion 108 and a second securing member portion 110, which are respectively configured to extend across a first front bottom corner of the device 102 and a first back bottom corner of the device 102, e.g., a left front and back bottom corner in FIGS. 1 and 2, when held in the device holding apparatus 100. For example, in some aspects, the first and second securing member portions 108 and 110 may be a continuous strap that forms a loop about the respective corner of the device 102. In other words, the first and second securing member portions 108 and 110 form a pocket or opening that is sized and positioned to capture and/or at least limit movement of a respective corner on one side of the device 102 when held in the device holding apparatus 100. In other aspects, the first and second securing member portions 108 and 110 may be part of a continuous flexible structure of material that defines a solid pocket. In an aspect, the first and second securing member portions 108, 110 may be connected at a first connection point 116 on a side of the device holding apparatus 100, e.g., adjacent to the side of the device 102 when held in the device holding apparatus 100, and at a second connection point 118 on the bottom of the device holding apparatus 100. The second securing member 106 similarly includes a first and second securing member portions 112, 114, which are configured to extend across the front and back of an opposite corner (e.g., bottom right corner) of the device 102, relative to the first and second securing member portions 108, 110, when held in the device holding apparatus 100, on the opposite side of the device holding apparatus 100 from the first securing member 104. Also, the first and second securing member portions 112, 114 of the second securing member 106 are connected at similar first and second connection points 120, 122 as compared to the first and second connection points 116, 118, but on the opposite side of the device holding apparatus 100. The second securing member 106, like the first securing member 104, may be formed by a continuous loop, by separate straps, and/or by a continuous piece of material, each of which defines a loop or pocket sized to receive and secure a respective corner of the device 102. Thus, the configuration of the first securing member 104 located on one side of the device 102 and the second securing member 106 located on the opposite side of the device 102 allows for the device 102 to be secured in place and limits the device 102 from shifting in the vertical and horizontal directions.

Each securing member 104, 106 may have an adjustable length so as to allow for different sized devices 102 to be secured in the device holding apparatus 100. For example, if a larger device is used, first and second securing members 104, 106 may be extended in length to secure the larger device, allowing for multiple devices to be used with the same device holding apparatus 100. For instance, in an example aspect, the first and second securing members 104, 106 may be a strap formed as a loop having a length that can be varied by moving the connection points 116, 120, which may be formed by a collar that is movable along the length and that is fixable at any location to define loops of different sizes. For example, the connection points 116, 120 in the form of a collar may be made from an elastic or rubber material or any other suitable material that compresses the overlapping lengths of the strap, is moveable based on a user applying hand/finger forces, and resists movement along the lengths of the strap once positioned and released. A similar configuration of the connection points 118, 120 in the form of a collar may additionally or alternatively be utilized. Further, adjusting the length of the securing members 104, 106 will also allow for the connection points 116, 118, 120, 122 to be located at different points on the side and bottom of the device 102.

Additionally, the device holding apparatus 100 includes a bottom support strap 142 that extends between and connects to connection points 118, 120, thereby connecting the first and second securing members 104, 106. In some cases, the bottom support strap 142 may be integral with and/or a continuation of the first and second securing members 104, 106. For instance, the bottom support strap 142 and the first and second securing members 104, 106 may be a single continuous loop of material, with connection points 116 118, 120, and 122 each being in the form of a collar, which may be adjustable.

Further, the device holding apparatus 100 further includes a first upper support strap 130 and a second support strap 132 configured to allow the device holding apparatus 100 to be suspended from a fixture or a body part of the user. The first and second upper support straps 130, 132 are respectively connected at one end to the respective first connection point 116 of the first securing member 104, and the first connection point 120 of the second securing member 106. In an aspect, the first and second upper support straps 130, 132 are integral with and/or a continuation of the first and second securing members 104, 106, respectively. For instance, the first and second upper support straps 130, 132 and the first and second securing members 104, 106 may be a single continuous loop of material, with connection points 116 118, 120, and 122 each being in the form of a collar, which may be adjustable. In another aspect, the first and second upper support straps 130, 132, the first and second securing members 104, 106, and also the bottom support strap 142 may be a single continuous loop of material, with connection points 116 118, 120, and 122 each being in the form of a collar, which may be adjustable. In further configurations, the first and second upper support straps 130, 132 may be connected to each other. In other words, in some cases, the entire device holding apparatus 100 may be formed of a single loop of material, while in other case the device holding apparatus 100 may be formed of two loops of material connected by the bottom support strap 142.

In an aspect, the first and second upper support straps 130, 132 may include one or both of a respective first and second upper movable connection member 134 and 136, 138 and 140 to aid in suspending the device holding apparatus 100. For example, to secure the device 102 to a fixture, the first upper support strap 130 in the form of a loop may be wrapped around a fixture, for example a metal bar, and one or both of the first and second upper connection members 134, 136 may be moved to tighten the loop formed by the first upper support strap 130 around the fixture. Further, the second upper support strap 132 may be similarly wrapped around the same fixture or a different fixture, and the first and second upper connection members 138, 140 may be movably adjusted to tighten the loop. The respective movable first and second upper connection members 134, 136, 138, 140 may be moved closer or further together to accommodate different sized fixtures. In an alternative aspect, such as when the first and second upper support straps 130, 132 form a continuous, integral loop, the device holding apparatus 100 may include a single one or a pair of the first and second upper connection members 134, 136, 138, 140, where each one or pair of upper connection members may encompass and connect both of the first and second upper support straps 130, 132. In this configuration, a size of the loop formed by the first and second upper support straps 130, 132 may be adjusted, e.g., to fit over a head of a user and then tighten the loop around a neck of the user. Additionally, in this configuration, one of the upper connection members may be movably adjusted downward to tighten the connection points 116, 120 and/or the first and second securing members 104, 106 about the device 102.

In an optional or additional aspect, the device holding apparatus 100 may further include a first back support strap 124 which extends across the back of the device holding apparatus 100, and hence across the back of the device 102 when being held, from the first connection point 116 of the first securing member 104 to the first connection point 120 of the second securing member 106. A second back support strap 126 similarly extends across the back of the device holding apparatus 100, and hence across the back of the device 102 when being held, from the second connection point 118 of the first securing member 104 to the second connection point 122 of the second pair of securing member 106. The first and second back support straps 124, 126 are connected by a third back support strap 128. The first, second, and third back support straps 124, 126, 128 provide additional support structures to prevent the device 102 from falling out of the device holding apparatus 100.

The third back support strap 128 may further be adjusted in length to account for different centers of gravity of different devices 102. For example the third back support strap 128 may be tightened or shortened, which will cause the first and second back support straps 124, 126 to have a V-shape as can be seen in FIG. 2. Further the third back support strap 128 may be horizontally slideable along the first and second back support straps 124, 126 to provide adjustable support relative to a back of the device 102. For example if the user has an attachment on the back of their device 120, the third back support strap 128 may be moved left or right to accommodate the attachment.

The plurality of support straps and securing members described above may be made from a variety of suitable materials for supporting the device 102 and/or for resisting movement of the device 102 with the device holding apparatus 100. In an exemplary aspect the first and second securing members 104, 106, and optionally the first, second, and third back support straps 124, 126, 128, may be made of a flexible high grip material, including a material having a relatively high coefficient of friction that resists movement of the device 102, such as but not limited to a rubber, an elastomeric material, or a compostable alternative. Further, for example, the upper support straps 130, 132 may be made of a flexible material having a relatively high strength that resist breaking of the straps, such as but not limited to a nylon or any other plastic, a metal, a braided material, a chain, etc.

The method or mechanism of adjusting the lengths of the straps and securing members may also be different in different aspects. Further, the connection members may use a variety of different connection mechanisms such as rubber, elastic, a collar, a buckle or a hook and loop material such as a VELCRO' material.

In a further aspect, the device holding apparatus 100 may have additional connection members, supports straps, and connection points to accommodate larger or different shaped devices. For example, there may be an additional connection point between the first connection points 116, 120 and the second connection points 118, 122, with an additional support strap connecting these points.

In an additional embodiment the device holding apparatus 100 may have an additional support bar. The additional support bar may attach to the bottom of the device holding apparatus 100 on one end and to either the user, or an additional fixture at the other end. This additional support bar may be optional attached to and removed from the device for use in situations where there may be excessive movement while using the device holding apparatus 100, or situations where the device holding apparatus would otherwise need additional support.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

What is claimed is:

1. A device holding apparatus, comprising:
    a first securing member and a second securing member respectively located at a first end and a second end of the device holding apparatus, wherein each of the first securing member and the second securing member further comprises:
        a first securing member portion and a second securing member portion that define a loop configured to receive a respective corner of a device;
    a bottom support strap connecting the first securing member and the second securing member;
    a first upper support strap connected to the first securing member;
    a second upper support strap connected to the second securing member;
    a first back support strap extending longitudinally across a back of the device holding apparatus, and that further extends to connect to a first connection point of a first side of the device and a first connection point of a second side of the device;
    a second back support strap extending longitudinally across the back of the device holding apparatus from a second connection point of the first side of the device to a second connection point of the second side of the device;
    a third back support strap extending vertically from and connected to points on the first back support strap to the second back support strap, wherein each end of the third back support strap can slide longitudinally along the first back support strap and second back support strap, respectively; and
    wherein each of the first securing member, second securing member, bottom support strap, first upper support strap, and second upper support strap sections of the device holding apparatus are formed of a single continuous loop, and wherein each of the first securing member, second securing member, bottom support strap, first upper support strap, and second upper support strap sections is defined by a plurality of collars that are movable along a length of the single continuous loop and that are fixable at any location to define a plurality of loops of different sizes along the single continuous loop.

2. The device holding apparatus of claim 1, wherein the first and second securing member portions of the first securing member are connected at a first connection point on a first side of the device holding apparatus and the first and second securing member portions of the second securing member are connected at a first connection point on a second side of the device holding apparatus.

3. The device holding apparatus of claim 2, wherein the first and second securing member portions of the first securing member are connected at a second connection point on a first side at the bottom of the device holding apparatus and the first and second securing member portions of the second securing member are connected at a second connection point on a second side of the bottom of device holding apparatus.

4. The device holding apparatus of claim 1, wherein each of the first and second upper support straps include one or both of a respective first and second upper movable connection member.

5. The device holding apparatus of claim 4, wherein the first and second upper movable connection members of the first upper support strap are configured for being securely connected around a first fixture and the first and second upper movable connection members of the second upper support strap are configured for being securely connected around the first fixture or a second fixture.

6. The device holding apparatus of claim 1, wherein the first and second securing member portions, of each of the first securing member and the second securing member, define a continuous strap that forms the loop.

7. The device holding apparatus of claim 1, wherein the third back support strap is adjustable in length and pulls the points on the first and second back support straps closer together thereby causing the first and second back support straps each to have an adjustable V-shape.

8. The device holding apparatus of claim 1, wherein the first and second securing members are adjustable in length.

9. The device holding apparatus of claim 1, further comprising additional connection points and additional support straps.

10. The device holding apparatus of claim 1, wherein the first and second securing members are made of an elastomeric material.

11. The device holding apparatus of claim 1, wherein each of the support straps are made from a flexible material.

* * * * *